Figure 1:
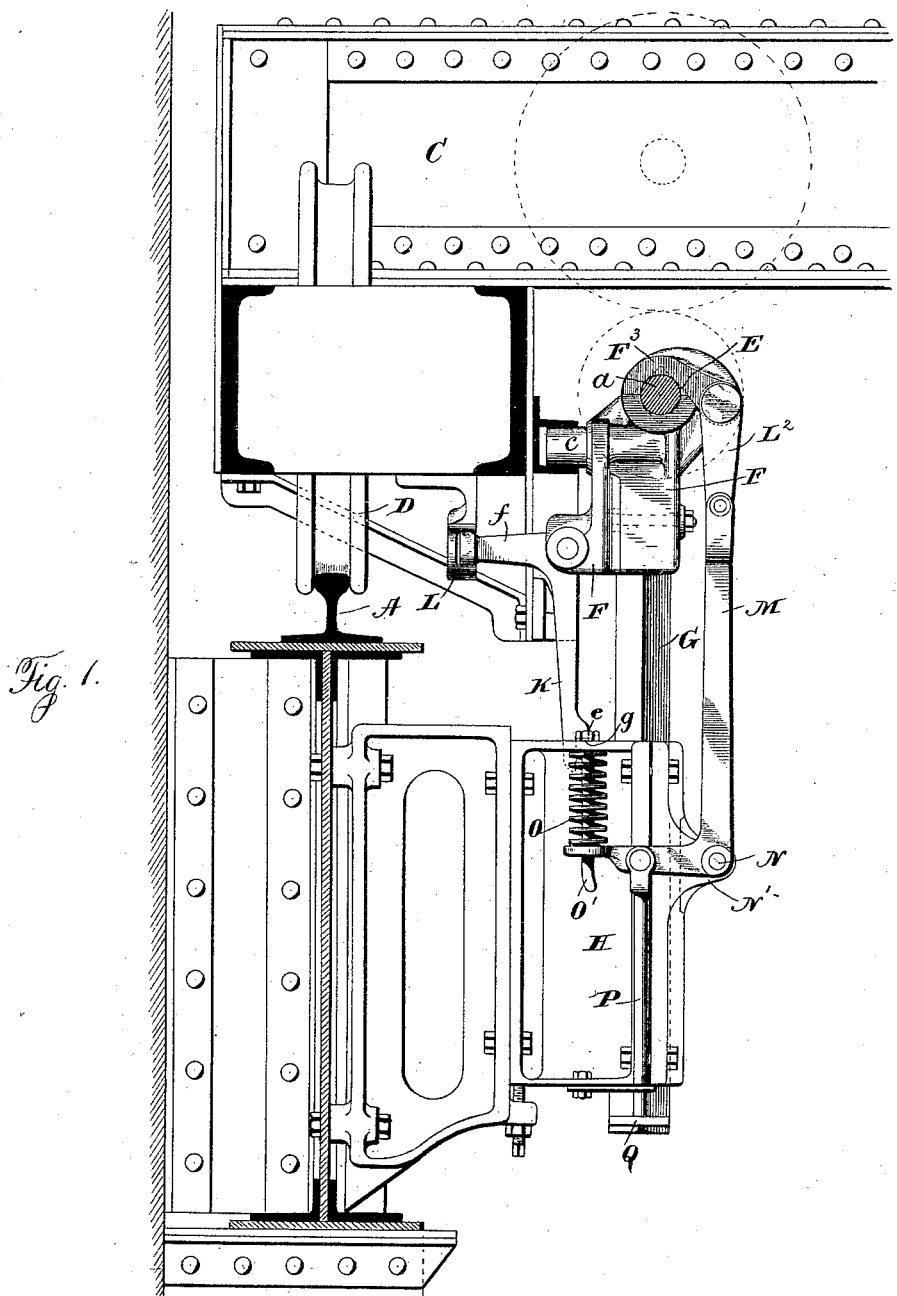

(No Model.) 5 Sheets—Sheet 1.

T. R. MORGAN, Sr. & J. R. MORGAN.
OVERHEAD TRAVELING CRANE.

No. 475,883. Patented May 31, 1892.

Witnesses
Jas. E. Hutchinson
G. F. Downing

Inventors:
T. R. Morgan Sr.
J. R. Morgan
By H. A. Simmons Attorney (No Model.) 5 Sheets—Sheet 2.

T. R. MORGAN, Sr. & J. R. MORGAN.
OVERHEAD TRAVELING CRANE.

No. 475,883. Patented May 31, 1892.

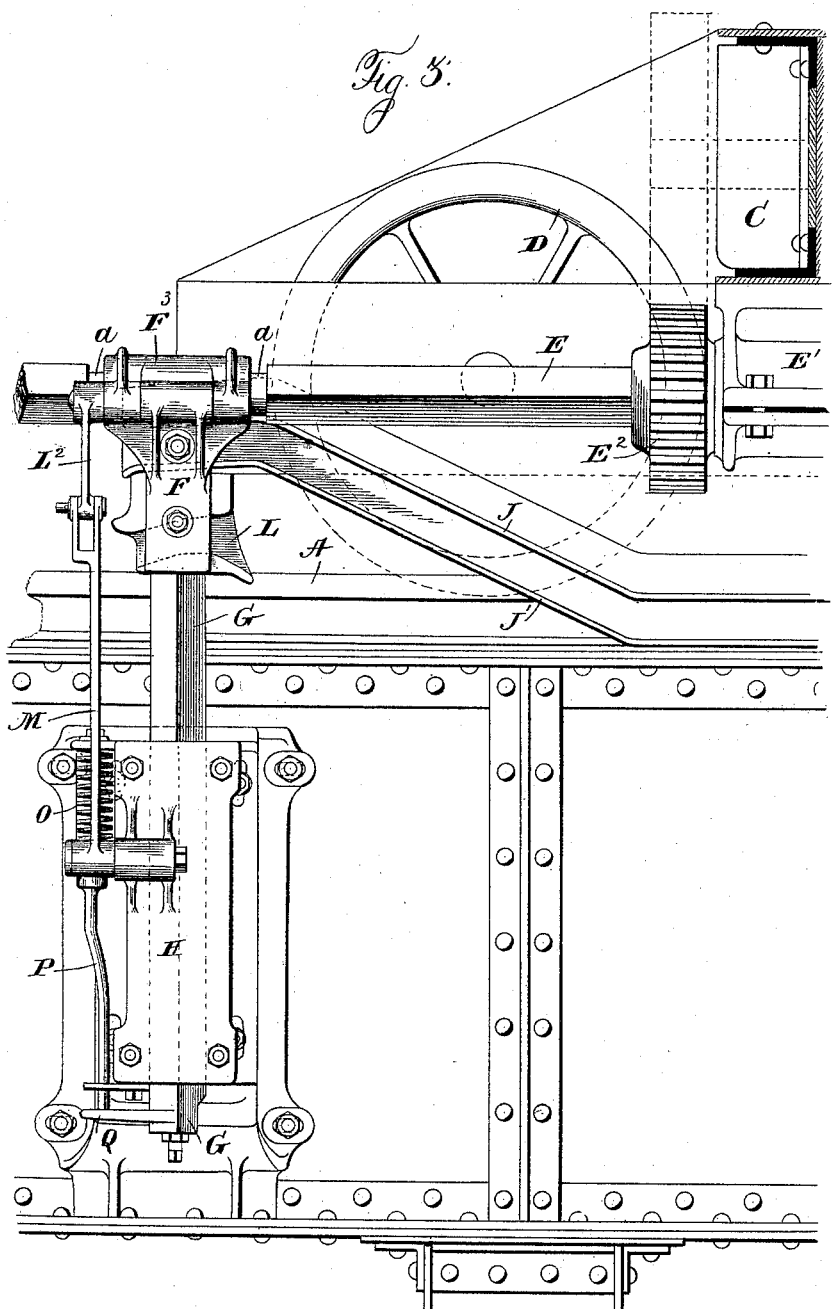

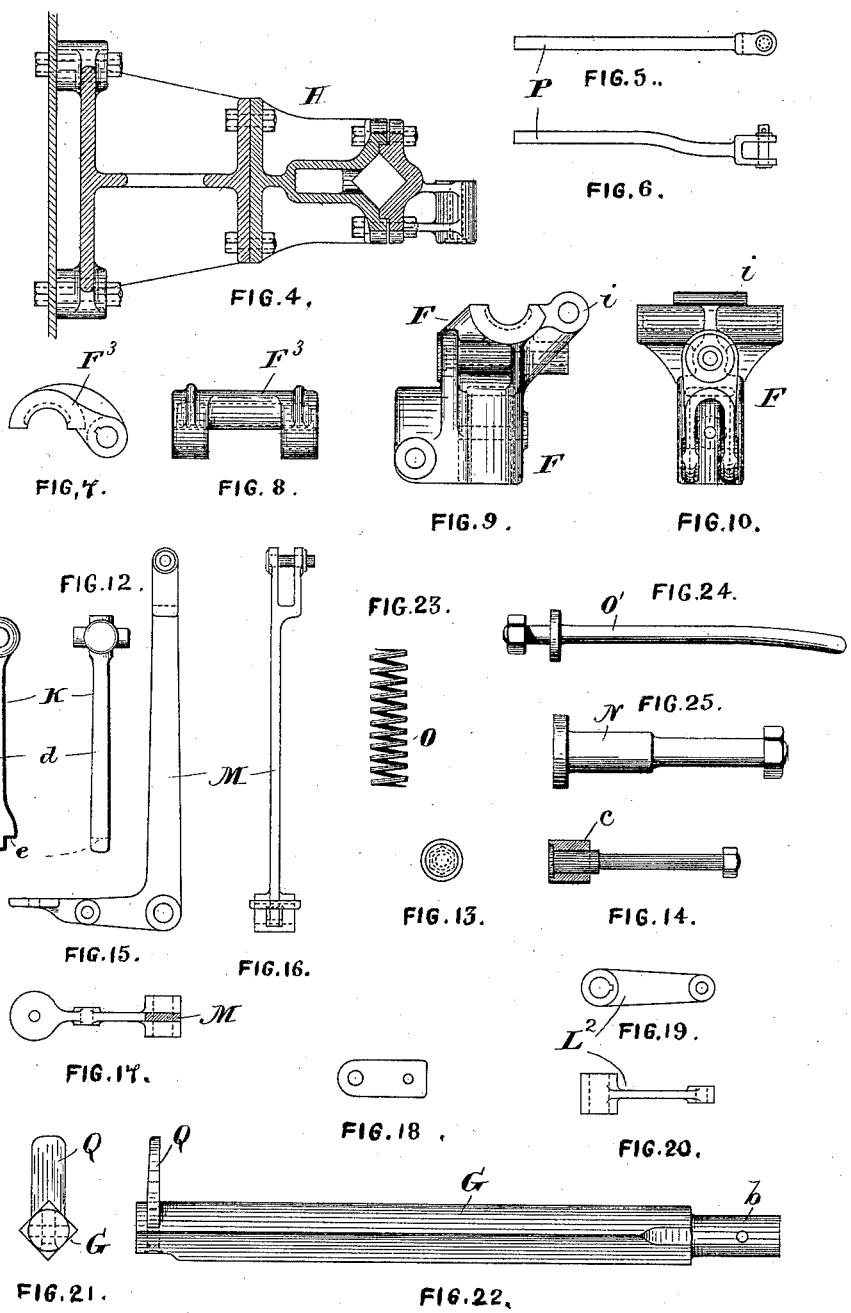

(No Model.) 5 Sheets—Sheet 5.

T. R. MORGAN, Sr. & J. R. MORGAN.
OVERHEAD TRAVELING CRANE.

No. 475,883. Patented May 31, 1892.

UNITED STATES PATENT OFFICE.

THOMAS R. MORGAN, SR., AND JOHN R. MORGAN, OF ALLIANCE, OHIO, ASSIGNORS OF ONE-FOURTH TO THOMAS R. MORGAN, JR., AND WILLIAM H. MORGAN, OF SAME PLACE.

OVERHEAD-TRAVELING CRANE.

SPECIFICATION forming part of Letters Patent No. 475,883, dated May 31, 1892.

pplication filed July 6, 1891. Serial No. 398,542. (No model.)

*To all whom it may concern:*

Be it known that we, THOMAS R. MORGAN, Sr., and JOHN R. MORGAN, of Alliance, in the county of Stark and State of Ohio, have invented certain new and useful Improvements in Overhead-Traveling Cranes; and we do hereby declare the following to be a full, clear, and exact description of the invention, which will enable others skilled in the art to which it appertains to make and use the same.

Our invention relates to an improvement in overhead-traveling cranes, and particularly to that class of cranes wherein motion is transmitted to the bridge, trolley, and winding-drum by a rotating angular shaft located adjacent to one of the trackways and parallel therewith. This rotating shaft passes through a sleeve or sleeves shaped to fit the shaft so as to revolve therewith, but free to slide thereon as the bridge moves, the said sleeve being supported in bearings on the bridge and provided with pinions for transmitting the rotary motion of the angular shaft to the driving-wheels of the bridge, trolley, and winding drum or drums. This angular shaft is necessarily approximately the length of the trackway on which the bridge moves, and hence must be supported in boxes at points between its ends. In order, however, to permit the sleeve carrying the toothed wheels which transmit the motion of the angular shaft to the other moving parts, and also other parts carried by the bridge to move throughout the length of travel of the bridge without coming in contact with the boxes supporting the angular shaft, it is necessary to make the shaft-supporting boxes movable and provide means for moving them one at a time as the bridge moves on its trackway, so that the sleeve and other parts have clear and unobstructed paths, and also to provide means for restoring the boxes to the normal position after the sleeve and other parts have passed the box.

The invention disclosed in this application relates solely to the angular shaft-supporting boxes and the means for lowering and raising same, and the invention herein disclosed is an improvement on the construction covered in application (Case G) filed by John R. Morgan, Serial No. 398,631, the improvement in this case relating solely to the cap or cover for the half-bearing and means for opening and closing said cap or cover.

Figure 2:
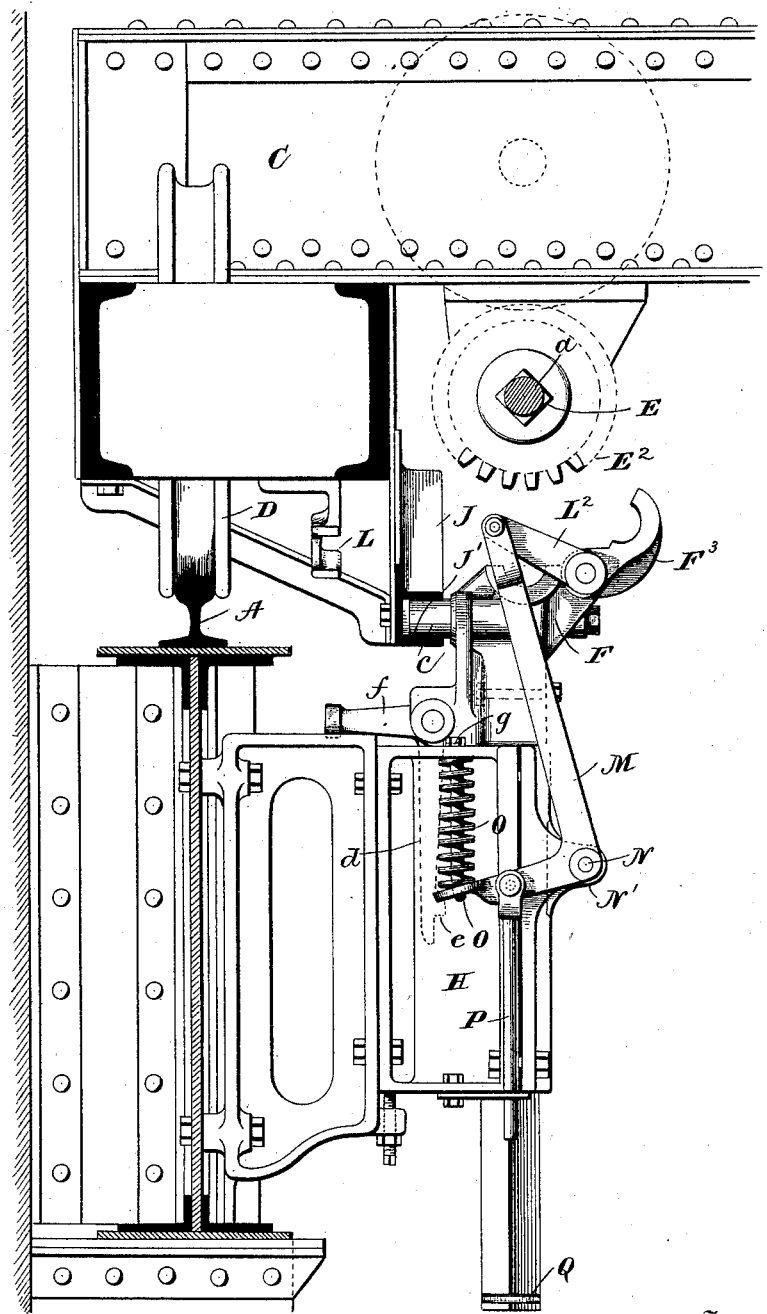
Figure 32:
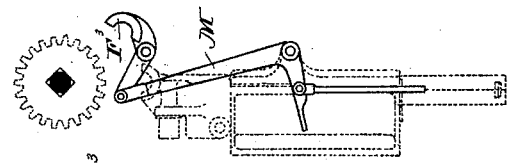
Figure 31:
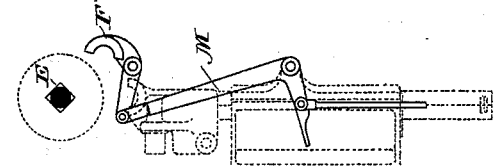
Figure 30:
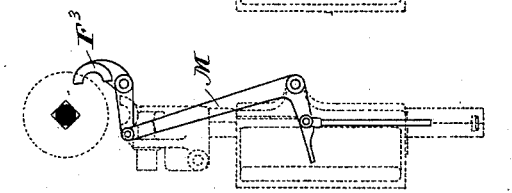
Figure 29:
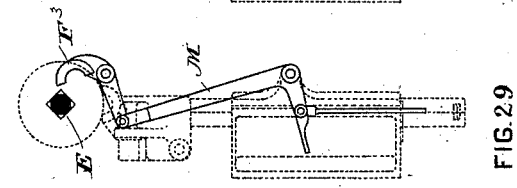
Figure 28:
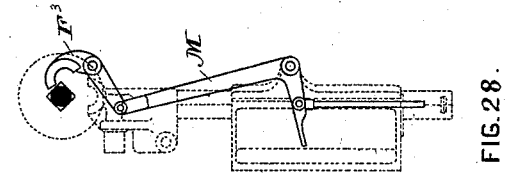

In the accompanying drawings, Figure 1 is a view in elevation showing one end of the bridge and one track, the bearing and pillar supporting same being elevated. Fig. 2 is a similar view showing the bearing depressed and the cap open. Fig. 3 is a view in elevation showing the angular shaft. Fig. 4 is a view in section of the bracket. Figs. 5 and 6 are views in elevation of a rod for automatically closing the caps. Figs. 7 and 8 are end and side views, respectively, of the cap or upper half of the bearing. Figs. 9 and 10 are views of the lower half of the bearing. Figs. 11 and 12 are views of the pillar and bearing sustaining device. Figs. 13 and 14 are views of the roller and its support carried by the lower half of the bearing. Figs. 15, 16, and 17 are views of the cap-operating lever. Fig. 18 is a view of the guide for the lower end of rod shown in Figs. 5 and 6. Figs. 19 and 20 are views of the arm connecting the cap-operating lever and cap. Figs. 21 and 22 are views of a pillar. Fig. 23 is a view of the spring for moving cap to an open position. Fig. 24 shows the rod which holds spring in place. Fig. 25 is an elevation of the bearing on which the cap-operating lever is mounted; and Figs. 26 to 32, inclusive, show the cap in the several positions it assumes while being opened.

A represents a rail or track secured to or on an elevated support, which latter may be secured to the side walls of the building or carried on pillars constructed for the purpose. The trackway A supports one end of the traveling bridge C, the opposite end of said bridge being similarly mounted on another track located at or near the opposite side of the building. The bridge C, which is designed to carry a trolley, is provided at its ends with wheels D, which latter rest and move on the trackways A, motion being imparted to one or more of the wheels at each end of the bridge by gearing driven by the angular shaft E. The driving-shaft E, as shown in Figs. 1, 2, and 3, is preferably square; but in any event it should be angular, in order to impart revolution to the sleeve to be hereinafter referred to. This shaft is located near one trackway A and parallel therewith and is provided at intervals with rounded sections, as shown at $a$, Fig. 3, which rests in the movable bearings. The sleeve which encircles the shaft E is located within the bracket E', Fig. 3, and is rigidly secured to the toothed wheel $E^2$, which latter imparts the motion of the shaft to the moving parts of the device carried on the bridge. The bearings F are located at intervals to support shaft E and are simply half-bearings, within which the rounded sections of the shaft rest. It would of course be impossible for the bracket E', the sleeve therein, and wheel $A^2$ to pass these bearings F while the latter are in their elevated positions and supporting the shaft. Hence it becomes necessary to temporarily displace the bearings as the bridge moves on the trackway. The bearings are secured to the upper cylindrical ends $b$ of the pillars G, (see Fig. 22,) which latter are mounted in the boxes or brackets H. (Shown clearly in Fig. 4.) By making the pillars angular in cross-section and mounting them in correspondingly-shaped brackets all possibility of the bearings turning during their movements is prevented.

The bearing is provided on its inner face with a roller $c$, (shown in detail in Fig. 14,) which latter engages the adjacent faces of the parallel guides J J', which project beyond the opposite ends of the sleeve and wheel E'. These guides are slightly inclined upwardly at the start, so as to give the pillar and bearing a slight lift as it is first engaged by the guides, after which they incline downwardly, as clearly shown in Fig. 3. From the foregoing it will be seen that as the bridge moves along the roller $c$, being on a line passing between flanges or guides J J', en ers the space between said guides, and as the inclination of these guides at the start is slightly upward it follows that the pillar G and bearing are slightly elevated. The purpose of this elevation of the parts will be explained later on. The flanges J J' then incline downwardly a sufficient distance to carry the bearings to a plane below the projections or obstructions on the bridge, and immediately under said obstructions are horizontal, after which they incline upwardly, so as to elevate the bearings to their positions to support the shaft. The ends of the guideway formed by the flanges are alike. Hence the movements of the bearings and pillars carrying same are alike when engaged by either end of the guideway or flanges. It will be seen at a glance that when the bearing and pillar are released they descend by gravity, the lower flange J' preventing them from descending suddenly, the upper flange J' simply acting as guard to force the parts down in the event of a tendency to stick. This being true, the upper flange J can be dispensed with at the horizontal portion or center of guideway, as shown clearly in Fig. 3. The flanges J J', or plates having these flanges thereon, are securely fastened to the bridge and to brackets depending from the bridge, and as they span or bridge over all the parts which could by any possibility engage the bearing it follows that the bearings are lowered and held in such depressed position until the parts which would engage the bearings have passed over the same, after which the latter is gradually but positively elevated to its normal position.

K represents the bearing-sustaining device or device for supporting the pillar and bearing thereon in their normal or elevated position, and consists of a bell-crank lever pivoted at its elbow to the bearing F. The longer arm $d$ of this lever is provided near its free end with a shoulder $e$, (see Fig. 7,) adapted to rest on the top of the bracket H and securely hold the pillar and bearing thereon elevated. The shorter arm $f$ of the bearing-sustaining device normally acts as a weight to hold the shoulder $e$ on its seat $g$, which, as shown, is slightly inclined to prevent accidental displacement; but in addition to acting as a weight it is also designed to engage the short inclined guides L and move the shoulder $e$ away from its seat $g$ and hold it depending over a recess or opening in bracket H, and when the parts are in position last described the pillar and bearing are free to descend.

We have previously stated that the lower guide J' is slightly inclined upward at its outer ends for the purpose of giving the pillar and bearing a slight upward movement at the start. This upward movement releases the shoulder $e$ from its seat $g$ and leaves the lever K or pillar-sustaining device free to be rocked. At this stage in the operation of the device the outer end of the shorter arm $f$ of the device K enters the short incline L and moves the longer arm $d$ to a position over or in a vertical plane with the recess or opening in the bracket H, adapted to receive same. By the time the shorter arm leaves the guide L the flanges J J' have started the pillar and bearing downwardly, and during this period the said pillar and bearing thereon are supported solely by the flanges J J'. The guides L are also double inclined guides. As the roller $c$ on the bearing leaves the guideway formed by flanges J J' the smaller guide L operates to move the shoulder over its seat on the bracket H and hold the bearing and pillar elevated.

The above parts are all disclosed in the application of John R. Morgan, above referred to, the improvement in this case consisting simply in a cap or cover for the half-bearings and means for opening and closing said cap or cover.

The lower half F of the bearing is provided on its outer side with an enlargement $i$, having an opening through same for the passage of a pintle on which the cover is mounted. The cover $F^3$ is provided with ears or knuckles through which said pintle passes and is keyed to the pintle so that it turns with the pintle. The pintle projects at one end beyond the cover for the reception of the hub of the link L². (Shown clearly in Figs. 19 and 20.) The pintle thus forms the axis on which the cap or cover turns, and hence it will be seen that in order to open or close the cover it is simply necessary to swing the link L² in one direction or the other. The swinging of the link and consequent opening and closing of the cover or cap is accomplished by the mechanism to be now described.

M represents a bell-crank lever pivoted on the bearing N, (see Fig. 25,) mounted in bearing N', integral with bracket H and near one side thereof. The upper forked end of the longer arm of this lever M is loosely connected to the depending end of link L², while the free end of the shorter arm is expanded or enlarged to form a seat or rest for the heavy spring O. This spring when in position is always under compression, and hence just as soon as the bell-crank lever is made free to move the spring instantly begins to move the bell-crank lever. This movement of the lever swings link slightly in toward the adjacent pillar. The movement of the cap is, however, caused by the movement of the half-bearing and pillar-block and is gradual, as will be hereinafter explained. The spring O is located at one side of its respective bracket and is retained in place by the rod O', Fig. 24, which latter is securely fastened to the top plate of the bracket. The shorter arm of the bell-crank or cap-operating lever M is provided at its enlargement with a hole for the passage of the bolt O'.

Figure 27:
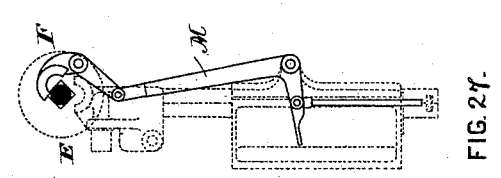
Figure 26:
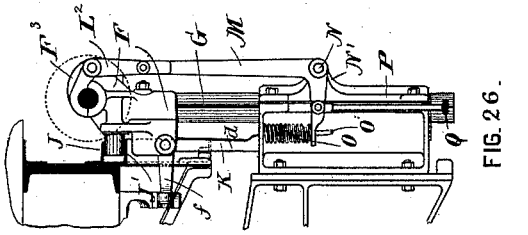

With the mechanism above described the cover would always remain loosely or partly open, and being once opened it is essential to provide means for tightly closing the cover and holding it closed. This is accomplished by the rod P, Figs. 5 and 6, and the step Q on the lower end of pillar G. The rod P is pivoted to the short arm of the lever M, and when the pillar G is elevated so that its half-bearing is in contact with the shaft E the lower end of said rod rests on the step and prevents any movement of the cap-operating lever M and securely holds the cap or cover in closed position, as shown in Fig. 1. When the pillar and its half-bearing are caused to descend by the mechanism before described, the spring O, acting on the short arm of lever M, causes said short arm to turn downwardly and the longer arm to move inwardly. When the parts are in their normal position, the link L² and long arm of lever M are in a straight line. Now by shifting the long arm to one side, as shown in Fig. 27, by means of the spring O, the lever and link are thrown out of line. This occurs the instant the pillar G begins to descend, and as the lever M is journaled to an immovable bracket and the link L² mounted on the vertically-movable half-bearing it follows that as the half-bearing and pillar begin to descend the cap is gradually thrown from a closed to an open position, as illustrated in Figs. 26 to 32. As the pillar-block begins to ascend from the position the cap is gradually brought to a closed position, the movement being completed and the parts locked by the step Q, engaging the lower end of rod P and moving same upwardly against the pressure of spring O until the long arm of lever M and link L² are again in line.

It is evident that numerous slight changes in the construction and arrangement of the several parts of the device might be made without departing from the spirit of the invention. Hence we would have it understood that we do not confine ourselves to the exact construction shown and described, but consider ourselves at liberty to make such changes and alterations as fairly fall within the spirit and scope of our invention.

Having fully described our invention, what we claim as new, and desire to secure by Letters Patent, is—

1. The combination of a vertically-movable pillar, a half-bearing secured thereto, a cap or half-bearing pivoted to the half-bearing on the pillar, and a device carried by the pillar-support and engaging a device secured to the cap, whereby when the pillar and half-bearing are being lowered the cap is turned on its axis, substantially as set forth.

2. The combination, with a bracket or support, a pillar adapted to move longitudinally therein, a half-bearing carried by the pillar, a cap or half-bearing pivoted to the half-bearing on the pillar, and a link rigidly connected with the cap, so as to move the same, of a part carried by the bracket or support and connected to said link, whereby when the pillar and half-bearing are being lowered the cap is turned on its axis, substantially as set forth.

3. The combination, with a bracket or support, an angular pillar mounted and adapted to move vertically therein, a half-bearing carried by said pillar, a cap or cover pivoted to the half-bearing, and a link or arm rigidly connected with the cap or cover, of a bell-crank lever pivoted to a stationary support, one arm of said lever being connected loosely with the link and adapted when the cap is closed over the half-box to rest in a line with said link, a spring bearing against the short arm of said lever, and means for sustaining the pressure of the spring when the pillar and half-bearing are in their elevated positions, substantially as set forth.

4. In an overhead-traveling crane, the combination, with a bridge, a shaft for transmitting motion to the bridge and moving parts thereon, a series of vertically-movable pillars, each carrying a half-bearing for the support of the shaft, and a cap or cover for each half-bearing, and means carried by the bridge for depressing and elevating the bearings, of a link rigidly connected to each cap and a lever carried by each pillar support or bracket and connected to its respective link, whereby as the pillars and half-bearings are lowered their caps are turned outwardly and away from the shaft, substantially as set forth.

5. The combination, with a pillar and half-bearing thereon and a step projecting from one side thereof, a cap or cover pivoted to the half-bearing, and a link rigidly connected to said cap or cover, of a bell-crank lever pivoted to a rigid support, the long arm of said lever being connected to the link carried by the cap, a spring bearing against the short arm thereof, and a rod connected to the short arm and bearing against the step, substantially as and for the purpose set forth.

6. The combination, with a vertically-movable pillar, a half-bearing thereon, a step projecting from one side thereof, a cap or cover pivoted to the half-bearing, and a link rigidly connected to said cap or cover, of a bell-crank lever pivoted to a rigid support and connected at the free end of its upright arm to the link, a spring bearing against the horizontal arm of said bell-crank, and a rod pivoted to said horizontal arm and adapted to be engaged and supported by said step when the parts are in their normal or elevated positions, substantially as set forth.

In testimony whereof we have signed this specification in the presence of two subscribing witnesses.

THOMAS R. MORGAN, Sr.
JOHN R. MORGAN.

Witnesses:
THOMAS R. MORGAN, Jr.,
FRANK E. DUSSEL.